United States Patent
Lee (10) Patent No.: US 7,557,859 B2
(45) Date of Patent: Jul. 7, 2009

(54) HOUSING FOR CCTV CAMERA (75) Inventor: Woon-ho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 636 days.

(21) Appl. No.: 11/140,076

(22) Filed: May 31, 2005

(65) Prior Publication Data
US 2005/0270414 A1    Dec. 8, 2005

(30) Foreign Application Priority Data
Jun. 8, 2004    (KR) ............... 10-2004-0041883

(51) Int. Cl.
*H04N 5/225* (2006.01)
(52) U.S. Cl. .................... 348/373; 348/360
(58) Field of Classification Search .......... 348/373, 348/375, 374, 360; 396/535, 541
See application file for complete search history.

(56) References Cited

U.S. PATENT DOCUMENTS

| | | | | |
|---|---|---|---|---|
| 4,382,671 A | | 5/1983 | Fukino et al. ............ 354/286 |
| 4,414,576 A | * | 11/1983 | Randmae ................ 348/373 |
| 5,394,210 A | | 2/1995 | Nomura et al. ......... 354/195.12 |
| 5,940,122 A | * | 8/1999 | Kizawa et al. ............ 348/151 |
| 5,966,176 A | * | 10/1999 | Chow et al. .............. 348/373 |
| D439,588 S | * | 3/2001 | Bergstrom et al. ......... D16/203 |
| 2003/0021602 A1 | * | 1/2003 | Ford ....................... 396/427 |
| 2004/0042779 A1 | * | 3/2004 | Maeda et al. ............. 396/79 |

FOREIGN PATENT DOCUMENTS

| | | |
|---|---|---|
| JP | 6-98215 | 8/1994 |
| JP | 2004-094003 | 3/2004 |
| KR | 1999-003406 | 1/1999 |

* cited by examiner

*Primary Examiner*—Tuan V Ho
(74) *Attorney, Agent, or Firm*—Roylance, Abrams, Berdo & Goodman, L.L.P.

(57) ABSTRACT

A housing for a CCTV camera is easily opened and assembled. The housing includes a housing cap having a filter glass, which filters incident light from an external light source and supplies the filtered light to a CCTV camera lens, on its front surface. One or more connecting protrusions are formed on a rear end of the housing cap along a circumference having a predetermined curvature. A camera case having as many first slots as connecting protrusions formed on its front surface accommodates and fixes the CCTV camera. The housing cap is easily locked and unlocked from the camera case by rotating the housing cap.

13 Claims, 8 Drawing Sheets

HOUSING FOR CCTV CAMERA

CROSS-REFERENCE TO RELATED APPLICATION

This application claims the benefit under 35 U.S.C. §119(a) of Korean Patent Application Serial No. 10-2004-0041883, filed on Jun. 8, 2004, in the Korean Intellectual Property Office, the entire disclosure of which is hereby incorporated by reference.

BACKGROUND OF THE INVENTION

1. Field of the Invention

The present invention relates to a housing for a camera. More particularly, the present invention relates to a housing for a CCTV (closed-circuit television) camera which is easily opened and assembled.

2. Description of the Related Art

Various of kinds of cameras are known, such as ordinary cameras, CCTV cameras, and so on. In general, a CCTV camera receives incident light from a subject in front of the camera. The light passes through a lens and is converted into an electrical signal by a CCD (charge-coupled device) or other similar device. Thus, the camera transmits an electrical signal (image data) corresponding to the subject in front of the camera.

Generally, a CCTV camera is supplied with alternating current (AC) power and converts the AC power into direct current (DC) power for internal operating power. A CCTV camera generally has a driver for driving a CCD, and signal processing circuits for processing a video signal based on the image data output from the CCD. The signal processing circuits output the processed video signals to an external monitor or video recorder. CCTV cameras are used in a wide variety of environments, such as residential areas, offices, hospitals, banks, department stores, and so on, for a variety of purposes. The purposes include preventing property theft, increasing security and public safety, controlling building entry, and monitoring mechanical operations and work flow in industrial locations. Recently, CCTV cameras have been installed in other environments such as underground parking lots and other areas where crimes frequently occur.

In such environments, cameras usually use a built-in focus-adjusting pin or a zoom-adjusting pin. The cameras are generally mounted in an external housing to protect the camera from external impacts and other environmental changes.

Figure 1:
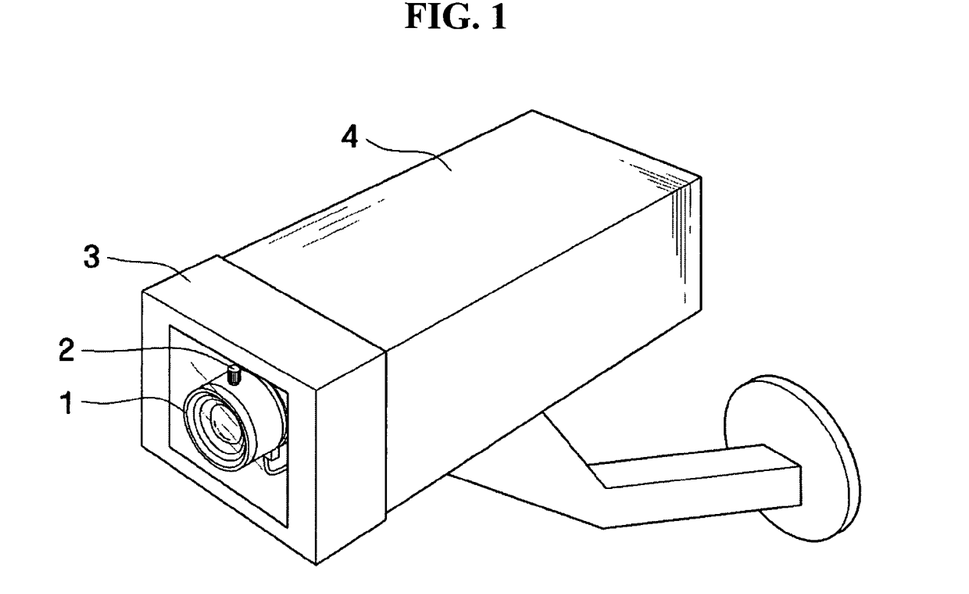
FIG. 1 is a perspective view of a conventional CCTV camera.

Referring to FIG. 1, a conventional CCTV camera 1 is mounted in a housing comprising a housing front portion 3 and a housing rear portion 4. The housing front portion 3 and the housing rear portion 4 are securely fastened to each mechanically using fasteners such as bolts and nuts.

A user may occasionally need to adjust the focus, the zoom, or the diaphragm of the CCTV camera 1. To make the adjustments, the housing front portion 3 must be opened to adjust a CCTV camera-adjusting pin 2. In fact, it may be necessary to make frequent adjustments because the ambient environment of the CCTV camera 1 changes frequently.

It is quite troublesome and inconvenient to open the housing front portion 3, which is securely fastened to the housing rear portion 4, every time adjustment is necessary.

Accordingly, there is a need for a housing for a CCTV camera that can be easily opened to make adjustments.

SUMMARY OF THE INVENTION

An aspect of the present invention is to solve at least the above problems and/or disadvantages and to provide at least the advantages described below. Accordingly, an aspect of the present invention is to provide a housing for a CCTV camera that can be easily opened and assembled so that the CCTV camera mounted therein can be easily adjusted.

Another aspect of the present invention is to provide a housing for a CCTV camera which securely fixes the camera.

In accordance with an aspect of the present invention, a housing for a CCTV camera includes a housing cap having a filter glass. The filter glass is located on the front surface of the housing cap and filters incident light from an external light source and supplies the filtered light to a CCTV camera lens. One or more connecting protrusions are formed on a rear end of the housing cap along a circumference having a predetermined curvature. A camera case has as many first slots as protrusions formed on its front surface. The case accommodates and fixes the CCTV camera. The housing cap is connected with the camera case such that the connecting protrusions are inserted into the first slots to then be rotated by a predetermined angle to lock the housing cap onto the housing case.

Each of the connecting protrusions may have a predetermined height, and may include a tapered portion formed on an end of the connecting protrusion so that the connecting protrusion is easily inserted into a corresponding first slot. The connecting protrusion may have a flange having a predetermined height to prevent the connecting protrusion from escaping from the first slot once inserted into the first slot.

Each of the first slots may include an opened slot, a locked slot, and a divisional protrusion. The opened slot has a height in a circumferential direction that is substantially the same as the maximum height of the connecting protrusion. The connecting protrusion is inserted into the opened slot when the housing cap is inserted into the camera case. The locked slot has a height in a circumferential direction that is substantially the same as the predetermined height of the connecting protrusion. The connecting protrusion is placed into the locked slot when the housing cap is rotated in a predetermined direction into a locked position. A divisional protrusion is located between the opened and locked slots. The divisional protrusion allows the position of the connecting protrusion to be changed from the opened slot to the locked slot, or from the locked slot to the opened slot, only when a predetermined amount of rotational force is applied to the housing cap.

The camera case may further include second slots spaced a predetermined distance away from and parallel to the first slots formed on the front surface. The first and second slots form resilient elastic portions, which are deformed by even a small compressive force and return to their original positions when the compressive force is removed.

The camera case may include an upper case and a lower case so that the CCTV camera can be easily installed into the camera case. The CCTV camera, the upper case, and the lower case can be connected together to form a single body.

The camera case may also include a connecting-line guide slot, which guides a board-connecting line of the CCTV camera to a CCD board installed inside the camera case to prevent the line from being caught between the upper and lower cases.

The camera case may further include a step-correcting protrusion. The protrusion expands the rear end of the housing cap in a predetermined direction when the housing cap is inserted into the camera case and rotated, thereby correcting a step between the rear end of the housing cap and the front surface of the camera case.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENT

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
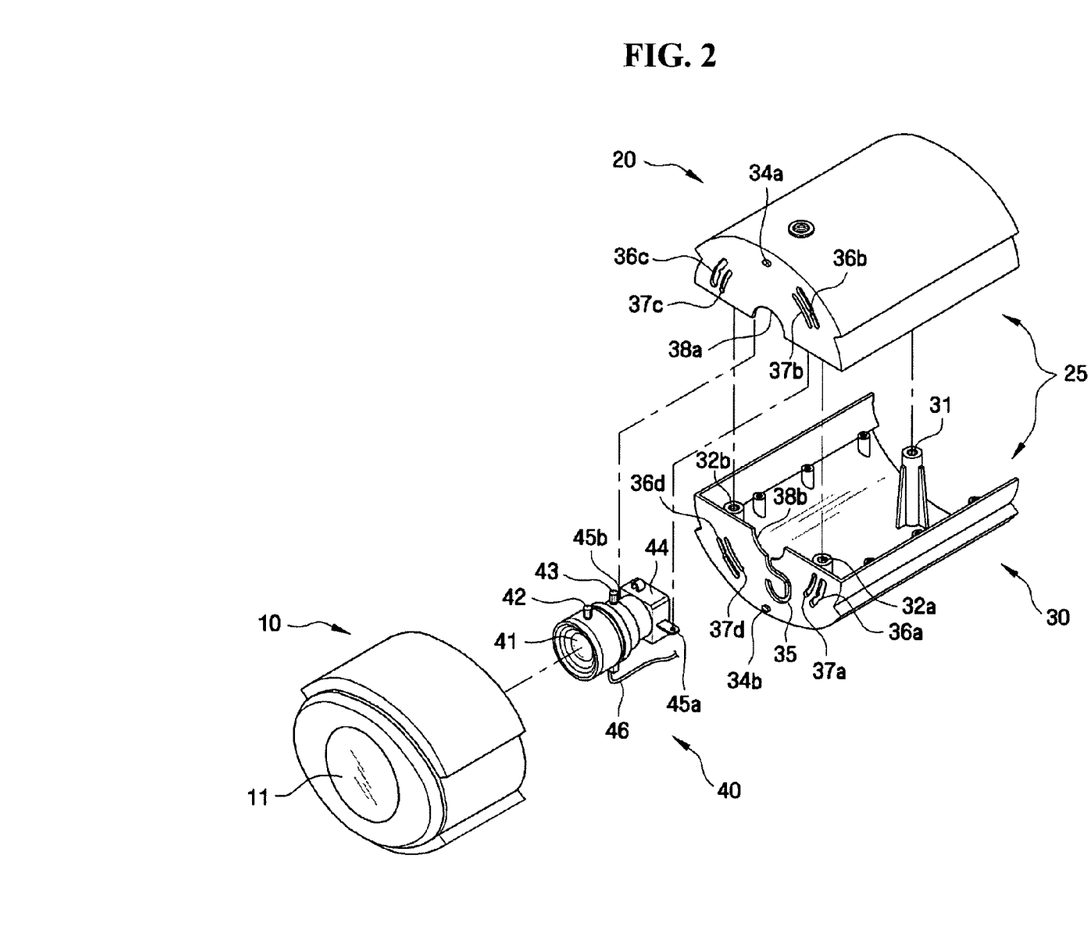
FIG. 2 is an exploded perspective view of a camera housing in accordance with an embodiment of the present invention.

FIG. 2 illustrates a camera housing according to an embodiment of the present invention. The camera housing comprises a housing cap 10 and a camera case 25. The housing case 25 has an elliptical shape and is divided into an upper case 20 and a lower case 30. When the upper case 20 and the lower case 30 are connected with each other, the CCTV camera 40 is fixed into the camera housing. The camera housing is preferably formed of a lightweight, elastomeric material. Specifically, the housing (other than the filter glass portion) may be formed of a synthetic resin such as plastic.

The housing cap 10 is elliptical in a cross-section perpendicular to an axial direction, and includes a filter glass 11 on its front surface. The filter glass 11 filters incident light from an external light source and supplies the filtered light to a CCTV camera lens.

The CCTV camera 40 comprises a camera lens 41 which receives light from a light source, a focus-adjusting pin 42 which adjusts the focus of the camera, a zoom-adjusting pin 43 which adjusts the degree of zoom, a camera flange 44 which allows the CCTV camera 40 to be fit into the front surface of the camera case 25 to prevent the CCTV camera 40 from escaping from the camera case 25, camera fixing locks 45a and 45b which allow the CCTV camera 40 to be engaged with the camera case 25, and a board-connecting line 46 which connects the camera 40 to a CCD board (not shown).

The upper case 20 may include a predetermined number of first slots 36b and 36c, as many second slots 37b and 37c as first slots 36b and 36c, a step-correcting protrusion 34a, and an upper accommodating-hole 38a which accommodates the CCTV camera 40.

The lower case 30 may include a predetermined number of first slots 36a and 36d, as many second slots 37a and 37d as first slots 36a and 36d, a step-correcting protrusion 34b, a lower accommodating-hole 38b which accommodates the CCTV camera 40, screw bosses 32a and 32b to receive screws passing through the camera fixing locks 45a and 45b, a screw boss 31 for connecting the upper case 20 and the lower case 30 together, and a connecting line guide slot 35 which guides the board-connecting line 46 so that it is not caught between the upper case 20 and the lower case 30 but is instead connected to the CCD board.

Figure 3:
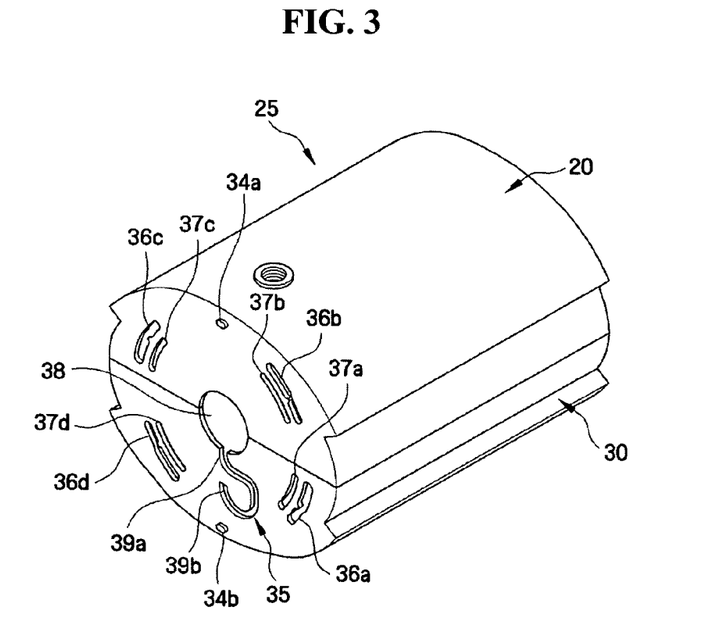
FIG. 3 is a perspective of the camera case shown in FIG. 2.

FIG. 3 illustrates the camera case 25 when the upper case 20 is connected to the lower case 30. When connected, the camera case has two step-correcting protrusions 34a and 34b, four first slots 36a-d, four second slots 37a-d, an accommodating hole 38, and a connecting-line guide groove 35 on the front surface of the camera case 25. At least one throughhole (not shown) through which a connecting line (not shown) passes is provided on a rear surface of the camera case 25. A CCD board or a PCB board may be connected to a power source and an external device, such as a video encoder, or any other suitable device, by the connecting line.

Figure 4:
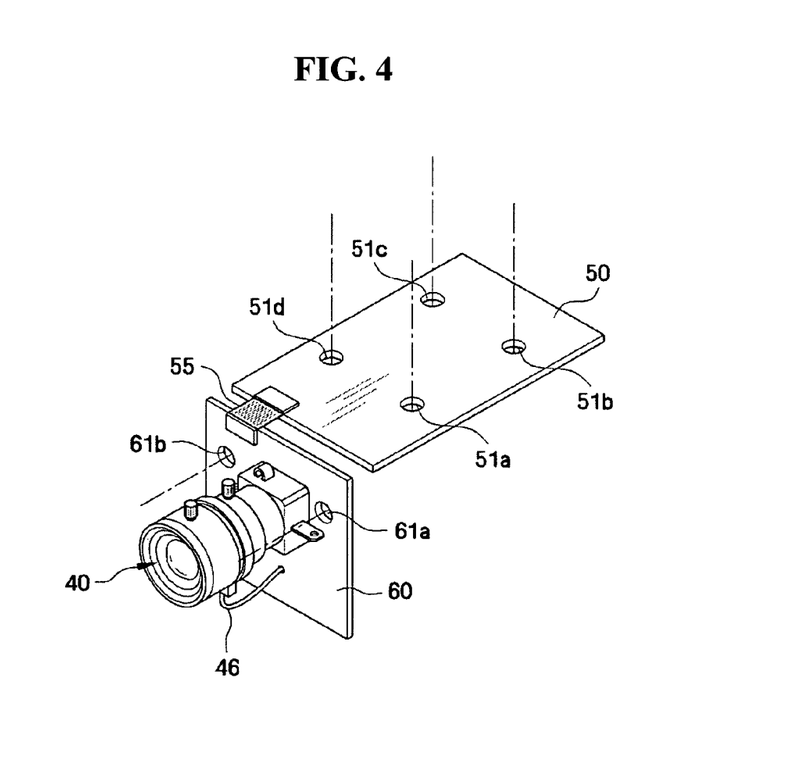
FIG. 4 is a perspective view of a combined camera-circuit body of the camera housing shown in FIG. 2.

FIG. 4 illustrates the combination of a CCTV camera 40, a CCD board 60, and a PCB board 50. For convenience, this combination will be referred to as a combined camera-circuit body. As seen in FIG. 4, the CCTV camera 40 is connected to the CCD board 60 by a connecting line 46 to pass analog signals generated by the CCTV camera in response to captured light to the CCD board. The CCD board 60, in turn, is connected to the PCB board 50 by a connecting line 55 to transmit and receive data.

The CCD board 60 and the PCB board 50 are preferably fixedly installed in the camera case 25. That is, the CCD board 60 is fixed inside the camera case 25, and the PCB board 50 is fixed inside the upper case 20 of the camera case 25. To this end, the CCD board 60 includes a predetermined number of throughholes 61a and 61b through which the CCD board 60 is connected to a front surface of the camera case 25 by mechanical fasteners such as a bolts and nuts. Similarly, the PCB board 50 includes a predetermined number of throughholes 51a, 51b, 51c, and 51d to allow the PCB board 50 to be connected to the upper case 20 by mechanical fasteners such as bolts and nuts.

Figure 5:
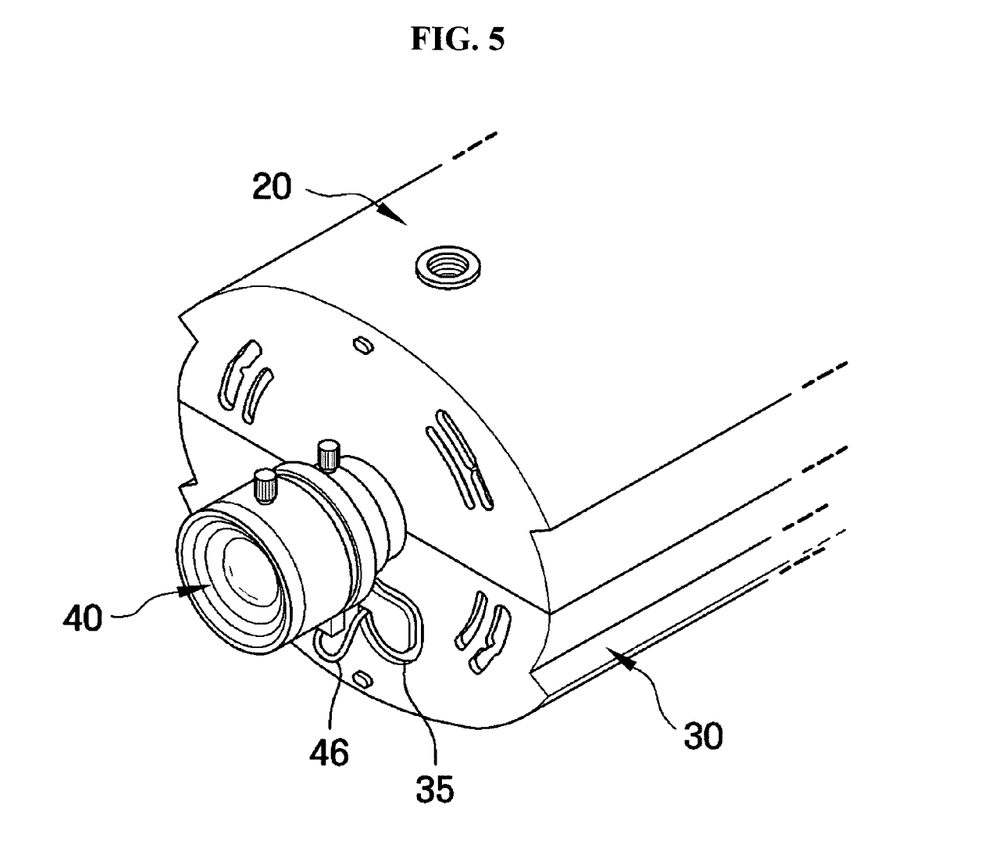
FIG. 5 is a perspective view showing the combined camera-circuit body shown in FIG. 4 installed inside the camera case shown in FIG. 3.

FIG. 5 illustrates the combined camera-circuit body shown in FIG. 4 installed inside the camera case 25. Here, the board connecting line 46 has moved to a peripheral part (39b of FIG. 3) of the connecting line guide slot 35 from a starting part (39a of FIG. 3) of the connecting-line guide slot 35. The connecting line guide slot 35 has a hook shape that allows the board connecting line 46 to moves to the peripheral part 39b. Typically, the CCTV camera 40 and the CCD board 60 are installed inside the camera case 25 after the board connecting line 46 of the CCTV camera 40 has been connected to the CCD board 60. Thus, during installation of the connected pieces, one end of the connecting-line guide slot 35 is open to the accommodating hole 38 to allow the connecting line 46 to be placed into the guide slot.

In FIG. 5, the housing cap 10 is not installed on the camera case 25. With the housing cap 10 removed, a user can adjust operating conditions of the CCTV camera 40 by adjusting the focus adjusting pin 42 or the zoom adjusting pin 43.

Figure 6:
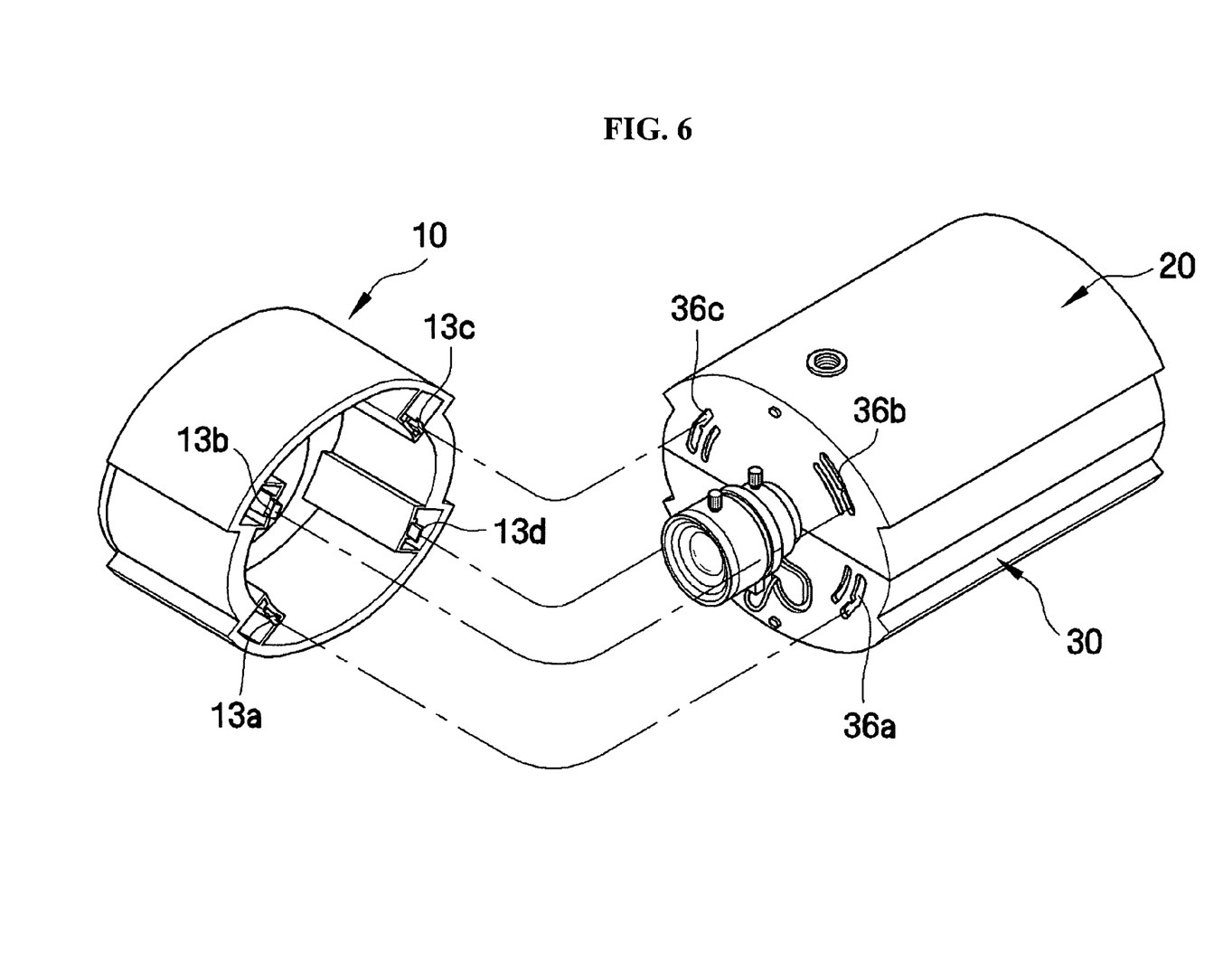
FIG. 6 is an exploded perspective view illustrating the connection between the housing cap and the camera case in accordance with an embodiment of the present invention.

FIG. 6 illustrates the connection between the housing cap 10 and the camera case 25. Connecting protrusions 13*a*, 13*b*, 13*c*, and 13*d* are formed at a rear end of the housing cap 10 along a circumference having a predetermined curvature and are connected with first slots 36*a*, 36*b*, 36*c*, and 36*d* of the camera case 25. The number of the connecting protrusions 13*a*, 13*b*, 13*c*, and 13*d* is the same as the number of the first slots 36*a*, 36*b*, 36*c*, and 36*d* of the camera case 25. The first slots 36*a*, 36*b*, 36*c*, and 36*d* formed on the front surface of the camera case 25 are formed along a circumference having the same predetermined curvature as the connecting protrusions.

Each of the connecting protrusions 13*a*-*d* and each of the slots 36*a*-*d* has substantially the same structure. Thus, for conciseness, only the construction and operation of the set of connecting protrusion 13*c* and slot 36*c* will be described in detail. The description is, of course, equally applicable to the other sets of connecting protrusions and slots.

Figure 7:
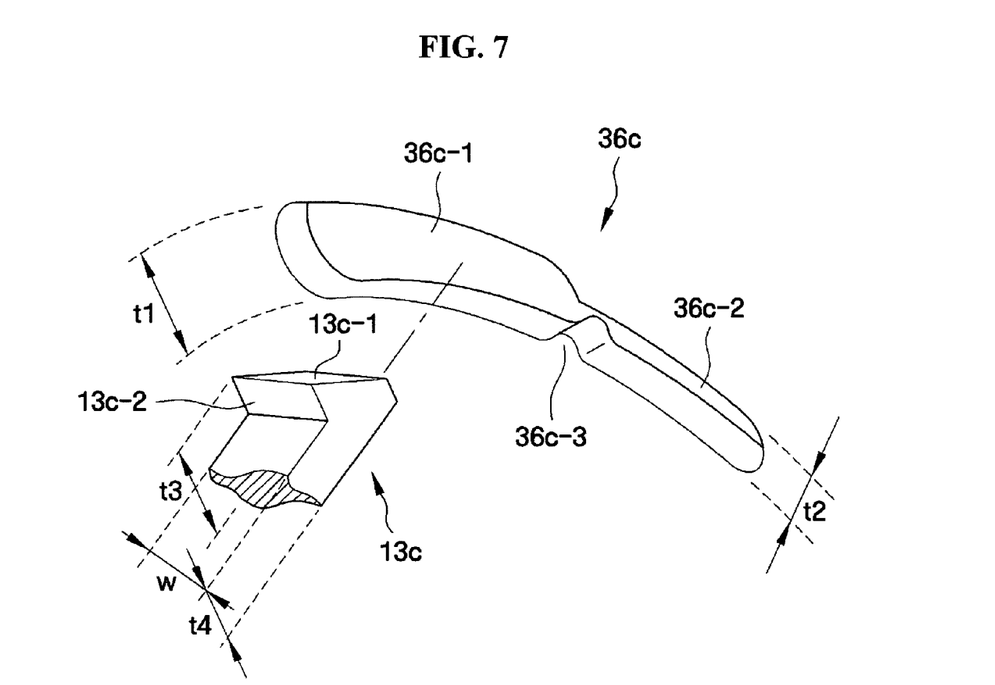
FIG. 7 is a detailed diagram of a connecting protrusion and a first slot in accordance with an embodiment of the present invention.

FIG. 7 is a detailed diagram of the connecting protrusion 13*c* and the first slot 36*c*. The connecting protrusion 13*c* has a tapered portion 13*c*-1 formed on an end so that the connecting protrusion 13*c* is easily inserted into the first slot 36*c*. The connecting protrusion 13*c* also has a flange 13*c*-2 that prevents the connecting protrusion 13*c* from escaping from the first slot 36*c* once inserted into the first slot 36*c*. The flange 13*c*-2 has a height corresponding to a difference between a maximum height t3 of the connecting protrusion 13*c* and a predetermined height t4 of the connecting protrusion 13*c*.

The first slot 36*c* has an opened slot 36*c*-1, a locked slot 36*c*-2, and a divisional protrusion 36*c*-3. The opened slot 36*c*-1 has a height t1 in a circumferential direction, and the height t1 is substantially the same as the maximum height t3 of the connecting protrusion 13*c*. The connecting protrusion 13*c* of the housing cap 10 is inserted into the first slot 36*c*. The locked slot 36*c*-2 has a height t2 in a circumferential direction, and the height t2 is substantially the same as the predetermined height t4 of the connecting protrusion body. The width of the locked slot 36*c*-2 is substantially the same as the width w of the connecting protrusion 13*c*. The connecting protrusion 13*c* is placed in the locked slot 36*c*-2 when the housing cap 10 is rotated clockwise. The divisional protrusion 36*c*-3 allows the position of the connecting protrusion 13*c* to be changed from the opened slot 36*c*-1 to the locked slot 36*c*-2 or from the locked slot 36*c*-2 to the opened slot 36*c*-1 only when a predetermined rotating force is applied to the housing cap 10. In addition, the divisional protrusion 36*c*-3 allows the user to detect by sound or by feel that the position of the connecting protrusion 13*c* has been changed.

Figure 8:
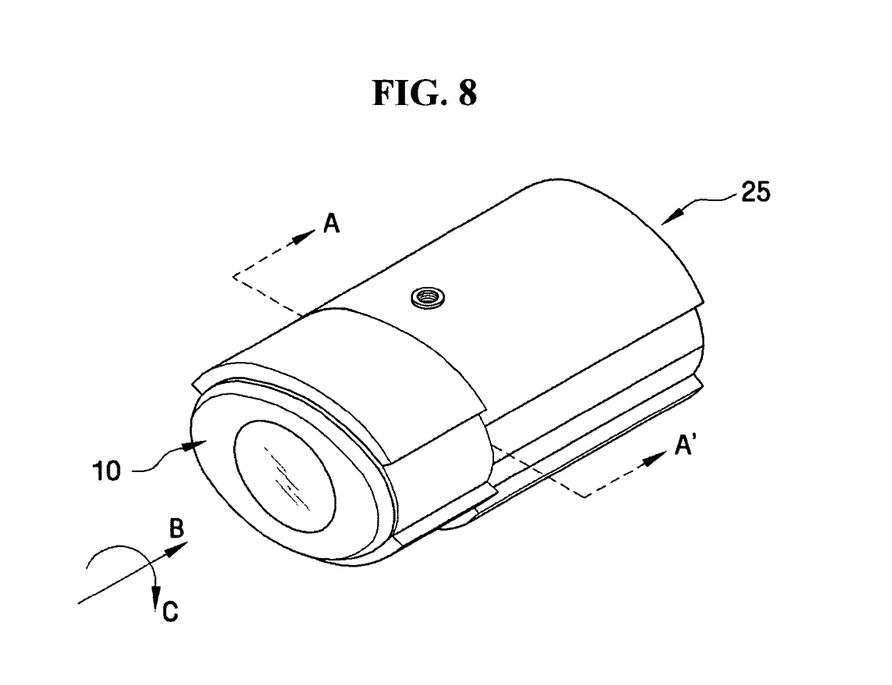
FIG. 8 illustrates a process of connecting the housing cap and the camera case with each other in accordance with an embodiment of the present invention.

FIG. 8 illustrates a process of connecting the housing cap 10 with the camera case 25. First, the housing cap 10 is pushed into a front surface of the camera case 25 in an axial direction as indicated by the arrow "B." Here, the connecting protrusions (13*a*, 13*b*, 13*c*, and 13*d* shown in FIG. 6) of the housing cap 10 are inserted into the corresponding opened slots (36*a*-1, 36*b*-1, 36*c*-1, and 36*d*-1 as shown in FIG. 7) of the first slots (36*a*, 36*b*, 36*c*, and 36*d* shown in FIG. 2) of the camera case 25. Next, the housing cap 10 is rotated clockwise by a predetermined angle as indicated by the arrow "C." The predetermined angle varies according to the width of the first slots 36*a*, 36*b*, 36*c*, and 36*d*, and is preferably 20 degrees.

To disassemble the housing cap 10 from the camera case 25, the above-described process is reversed. In other words, the housing cap 10 is rotated counterclockwise by a predetermined angle and then pulled in the axial direction, thereby disconnecting the housing cap 10 from the camera case 25.

Figure 9:
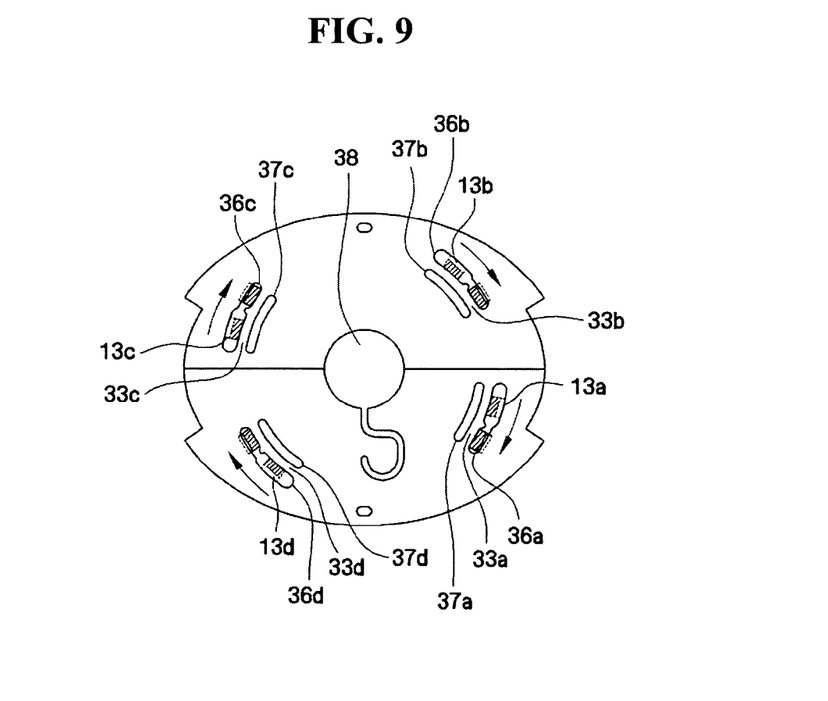
FIG. 9 is a cross-sectional view taken along line A-A' of FIG. 8.

FIG. 9 is a cross-sectional view taken along line A-A' of FIG. 8. After the housing cap 10 is inserted into the camera case 25 and rotated, the connecting protrusions 13*a*, 13*b*, 13*c*, and 13*d* are placed inside the camera case 25 and are not allowed to escape from the camera case 25 by the flanges 13*a*-2, 13*b*-2, 13*c*-2, and 13*d*-2 (as shown in FIG. 7).

When the connecting protrusions 13*a*, 13*b*, 13*c*, and 13*d* move between each of the opened slots 36*a*-1, 36*b*-1, 36*c*-1, and 36*d*-1 and each of the locked slots 36*a*-2, 36*b*-2, 36*c*-2, and 36*d*-2 (as shown in FIG. 7), a compressive force is applied to the divisional protrusions 36*a*-3, 36*b*-3, 36*c*-3, and 36*d*-3 (as shown in FIG. 7), so that the user can detect the change from an opened state to a closed state. Accordingly, the divisional protrusions 36*a*-3, 36*b*-3, 36*c*-3, and 36*d*-3 (as shown in FIG. 7) should have some elasticity. Second slots 37*a*, 37*b*, 37*c*, and 37*d*, which are spaced a predetermined distance away from and parallel to the first slots 36*a*, 36*b*, 36*c*, and 36*d*, are formed on the front surface of the camera case 25. Resilient, elastic portions 33*a*, 33*b*, 33*c*, and 33*d*, which are deformed by even a small compressive force and return to their original positions when the compressive force is removed, are formed between each of the first slots 36*a*, 36*b*, 36*c*, and 36*d* and each of the second slots 37*a*, 37*b*, 37*c*, and 37*d*. If the second slots 37*a*, 37*b*, 37*c*, and 37*d* are not provided, an excessively large rotational force is needed to cause the connecting protrusions 13*a*, 13*b*, 13*c*, and 13*d* to move between each of the opened slots 36*a*-1, 36*b*-1, 36*c*-1, and 36*d*-1 (as shown in FIG. 7) and each of the locked slots 36*a*-2, 36*b*-2, 36*c*-2, and 36*d*-2 (as shown in FIG. 7). Further, the divisional protrusions 36*a*-3, 36*b*-3, 36*c*-3, and 36*d*-3 (as shown in FIG. 7) may be abraded, preventing the divisional protrusions 36*a*-3, 36*b*-3, 36*c*-3, and 36*d*-3 (as shown in FIG. 7) from functioning properly.

Figure 10:
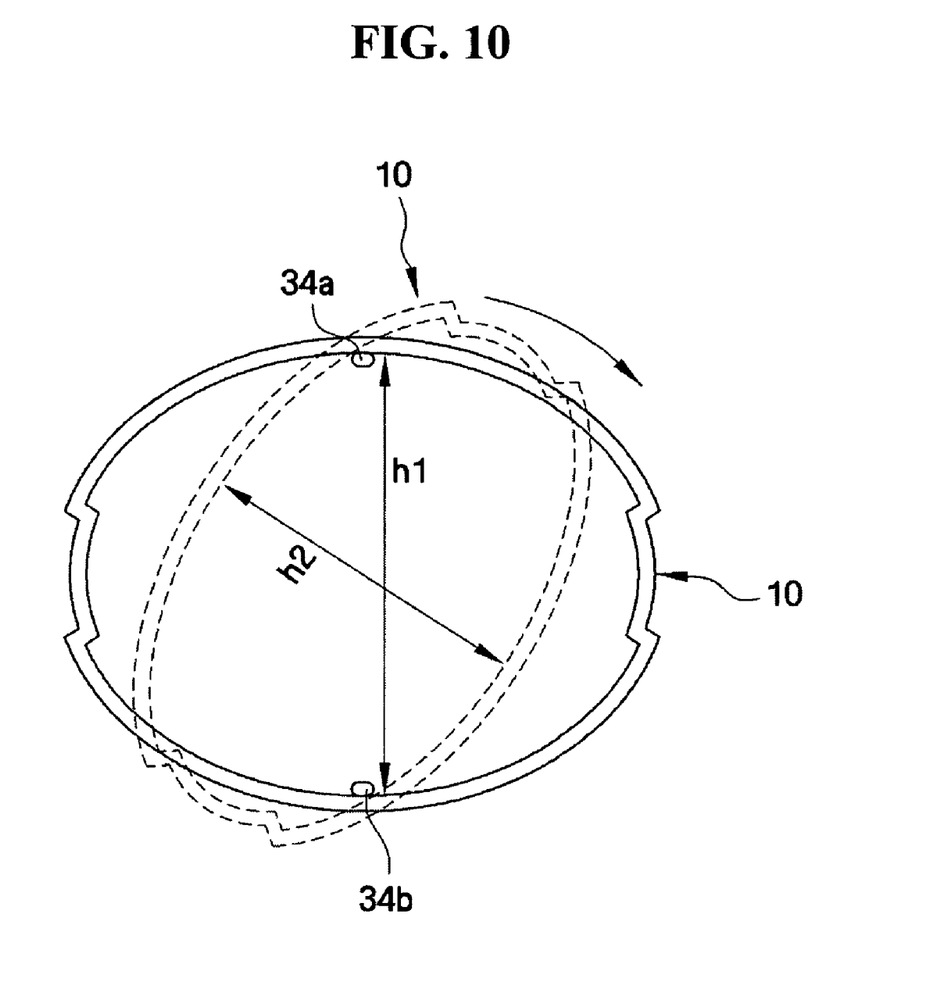
FIG. 10 is a diagram that illustrates the function of a step-correcting protrusion in accordance with an embodiment of the present invention.

FIG. 10 is a diagram explaining the function of the step-correcting protrusion 34*a*. The step-correcting protrusion 34*a* expands the rear end of the housing cap 10 in a predetermined direction when the housing cap 10 is inserted into the camera case 25 and rotated, thereby correcting a step between the rear end of the housing cap 10 and the front surface of the camera case 25. To explain further, referring back to FIG. 8, when the housing cap 10 and the camera case 25 are connected with each other, the external side of the rear end of the housing cap 10 and the external side of the front surface of the camera case 25 should mate smoothly without any step. However, the rear end of the housing cap 10 is open and it can be easily deformed by heat or pressure. Thus, referring to FIG. 10, the internal height h2 of the housing cap may shrink. If the deformed housing cap is mounted to the camera case 25, there will be a step at the junction of the housing cap 10 and the camera case 25.

To correct this step, step-correcting protrusions 34*a* and 34*b* are provided on the front surface of the camera case 25. As shown in FIG. 10, when the housing cap 10 is placed at a position indicated by the dotted line, that is, when the housing cap 10 is initially inserted into the camera case 25, the internal height of the rear end of the housing cap 10 is h2. After the housing cap 10 is rotated and fixed, the internal height of the rear end of the housing cap 10 is enlarged to h1 by the step-correcting protrusions 34*a* and 34*b*, thereby preventing a step between the housing cap 10 and the camera case 25.

As described above, in a housing for the CCTV camera according to the present invention, the housing and the CCTV camera can be easily assembled to and disassembled from each other. Thus, a user can easily perform fine adjustment of the CCTV camera. Further, a user can easily clean the lens and filter glass located on the front portion of the housing of the CCTV camera.

While the invention has been shown and described with reference to certain embodiments thereof, it will be understood by those skilled in the art that various changes in form and details may be made therein without departing from the spirit and scope of the invention as defined by the appended claims.

What is claimed is:

1. A housing for a CCTV camera, the housing comprising:
a housing cap having a filter glass which filters incident light from an external light source and supplies the filtered light to a CCTV camera lens on its front surface, and one or more connecting protrusions formed on a rear end thereof along a circumference having a predetermined curvature; and
a camera case having as many first slots as connecting protrusions formed on its front surface and accommodating and fixing the CCTV camera;
wherein the housing cap is connected with the camera case such that the connecting protrusions are inserted into the first slots to then be rotated at a predetermined angle; and
the camera case further comprises a step-correcting protrusion, which allows a rear end of the housing cap to expand in a predetermined direction when the housing cap is inserted onto the camera case and rotated, thereby correcting a step between the rear end of the housing cap and the front surface of the camera case.

2. The housing of claim 1, wherein a cross-section perpendicular to an axial direction of the housing cap and a cross-section perpendicular to the axial direction of the camera case have elliptical shapes.

3. The housing of claim 1, wherein each of the connecting protrusions comprises:
a connecting protrusion body;
a tapered portion formed on an end of the connecting protrusion so that the connecting protrusion is easily inserted into a first corresponding slot; and
a flange having a predetermined height to prevent the connecting protrusion body to prevent the connecting protrusion from escaping from the first slot once inserted into the first slot.

4. The housing of claim 3, wherein the flange's predetermined height is a difference between a maximum height of the connecting protrusion and a predetermined height of the connecting protrusion body.

5. The housing of claim 1, wherein the connecting slots are formed on the front end of the camera case along a circumference having a predetermined curvature.

6. The housing of claim 1, wherein the camera case includes an upper case and a lower case to accommodate the CCTV camera in the camera case, and the CCTV camera, the upper case, and the lower case are connected together into a single body.

7. The housing of claim 6, wherein the camera case further comprises a connecting-line guide slot, which guides a board-connecting line of the CCTV camera to a CCD board installed inside the camera case without being caught between the upper and lower cases.

8. A housing for a CCTV camera, the housing comprising:
a housing cap having a filter glass which filters incident light from an external light source and supplies the filtered light to a CCTV camera lens on its front surface, and one or more connecting protrusions formed on a rear end thereof along a circumference having a predetermined curvature; and
a camera case having as many first slots as connecting protrusions formed on its front surface and accommodating and fixing the CCTV camera;
wherein the housing cap is connected with the camera case such that the connecting protrusions are inserted into the first slots to then be rotated at a predetermined angle; and
wherein each of the first slots comprises:
an opened slot, which has a height in a circumferential direction, the height being substantially the same as a height of a flange of the connecting protrusion, and into which the connecting protrusion is inserted when the housing cap is inserted into the camera case;
a locked slot, which has a height in a circumferential direction, the height being substantially the same as a predetermined height of a connecting protrusion body, and into which the connecting protrusion is placed when the housing cap is rotated in a predetermined direction; and
a divisional protrusion, which allows the position of the connecting protrusion to be changed from the opened slot to the locked slot or from the locked slot to the opened slot only when a predetermined rotating force is applied to the housing cap.

9. The housing of claim 8, wherein the camera case further comprises a step-correcting protrusion, which allows a rear end of the housing cap to expand in a predetermined direction when the housing cap is inserted onto the camera case and rotated, thereby correcting a step between the rear end of the housing cap and the front surface of the camera case.

10. A housing for a CCTV camera, the housing comprising:
a housing cap having a filter glass which filters incident light from an external light source and supplies the filtered light to a CCTV camera lens on its front surface, and one or more connecting protrusions formed on a rear end thereof along a circumference having a predetermined curvature; and
a camera case having as many first slots as connecting protrusions formed on its front surface and accommodating and fixing the CCTV camera;
wherein the housing cap is connected with the camera case such that the connecting protrusions are inserted into the first slots to then be rotated at a predetermined angle; and
the camera case further comprises second slots, which are spaced a predetermined distance apart from and parallel to the first slots, formed on its front surface, so that resilient elastic portions are formed between each of the first slots and each of the second slots.

11. A housing for a CCTV camera, the housing comprising:
a housing cap having a filter glass which filters incident light from an external light source and supplies the filtered light to a CCTV camera lens on its front surface, and one or more connecting protrusions formed on a rear end thereof along a circumference having a predetermined curvature; and
a camera case having as many first slots as connecting protrusions formed on its front surface and accommodating and fixing the CCTV camera;
wherein the housing cap is connected with the camera case such that the connecting protrusions are inserted into the first slots to then be rotated at a predetermined angle;
the camera case includes an upper case and a lower case to accommodate the CCTV camera in the camera case, and the CCTV camera, the upper case, and the lower case are connected together into a single body;

the camera case further comprises a connecting-line guide slot, which guides a board-connecting line of the CCTV camera to a CCD board installed inside the camera case without being caught between the upper and lower cases; and the connecting-line guide slot has a hook shape, and a peripheral part of the hook-shaped connecting-line guide slot allows the board-connecting line to be stably placed therein.

12. A housing for a video camera comprising:

a housing cap;

a plurality of connecting protrusions formed on a rear end of the housing cap, the connecting portions being located along a circumference having a predetermined curvature;

a camera case for accommodating a video camera;

a plurality of first slots formed in the front surface of the camera case, with as many first slots as connecting protrusions, each of the first slots having an opened slot portion, a locked slot portion, and a divisional slot portion; and a plurality of second slots formed in the front surface of the camera case, the second slots being generally parallel to and spaced apart from the first slots to form resilient elastic portions between the slots;

wherein the first slots receive the connecting protrusions to detachably connect the housing cap to the camera case.

13. A housing for a video comprising:

a housing cap;

a plurality of connecting protrusions formed on a rear end of the housing cap, the connecting portions being located along a circumference having a predetermined curvature;

a camera case for accommodating a video camera;

a plurality of first slots formed in the front surface of the camera case, with as many first slots as connecting protrusions, each of the first slots having an opened slot portion, a locked slot portion, and a divisional slot portion; and a plurality of step-correcting protrusions on the front surface of the camera case, the protrusions interacting with the housing cap to prevent steps between the rear end of the housing cap and the front surface of the camera case;

wherein the first slots receive the connecting protrusions to detachably connect the housing cap to the camera case.

* * * * *